(12) United States Patent
Choudhary

(10) Patent No.: US 11,768,719 B2
(45) Date of Patent: *Sep. 26, 2023

(54) SELECTIVELY FILTERING APPLICATIONS FROM AN APPLICATION VOLUME

(71) Applicant: VMware, Inc., Palo Alto, CA (US)

(72) Inventor: Jairam Choudhary, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,913

(22) Filed: Sep. 17, 2021

(65) Prior Publication Data

US 2022/0004446 A1 Jan. 6, 2022

Related U.S. Application Data

(63) Continuation of application No. 14/482,105, filed on Sep. 10, 2014, now Pat. No. 11,126,476.

(60) Provisional application No. 61/875,991, filed on Sep. 10, 2013.

(51) Int. Cl.
*G06F 9/54* (2006.01)
*G06F 9/50* (2006.01)
*G06F 9/445* (2018.01)
*G06F 9/46* (2006.01)
*G06F 8/61* (2018.01)

(52) U.S. Cl.
CPC ............. *G06F 9/542* (2013.01); *G06F 8/63* (2013.01); *G06F 9/44584* (2013.01); *G06F 9/468* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 7,117,294 B1* | 10/2006 | Mi | G06F 3/0605 711/170 |
| 7,254,682 B1* | 8/2007 | Arbon | G06F 11/1451 714/E11.123 |
| 7,870,153 B2 | 1/2011 | Croft et al. | |
| 8,010,701 B2 | 8/2011 | Wilkinson et al. | |
| 8,290,901 B2 | 10/2012 | Whitehead, Jr. et al. | |
| 8,301,686 B1* | 10/2012 | Appajodu | G06F 9/5077 718/1 |
| 8,438,654 B1 | 5/2013 | von Eicken et al. | |
| 8,510,271 B1* | 8/2013 | Tsaur | G06F 11/1451 707/649 |
| 8,539,137 B1* | 9/2013 | Protassov | G06F 3/0659 711/6 |
| 8,677,351 B2 | 3/2014 | Le et al. | |
| 2005/0278278 A1* | 12/2005 | Petev | G06F 9/445 |
| 2008/0243855 A1 | 10/2008 | Prahlad et al. | |

(Continued)

*Primary Examiner* — Eddy Cheung

(57) ABSTRACT

Examples disclosed herein provide systems, methods, and software for attaching an application to a computing system. In one example, a method of attaching at least one application to the computing system includes identifying an application attach triggering event, and identifying at least one application based on the application attach triggering event. The method further includes attaching an application volume to the computing system that contains the at least one application, and filtering one or more applications from the application volume that are not the at least one application.

18 Claims, 5 Drawing Sheets

(56) References Cited

U.S. PATENT DOCUMENTS

| | | |
|---|---|---|
| 2010/0281083 A1 | 11/2010 | Purtell, II et al. |
| 2011/0055299 A1 | 3/2011 | Phillips |
| 2012/0054742 A1 | 3/2012 | Eremenko et al. |
| 2012/0174096 A1* | 7/2012 | Conover ............. G06F 9/45558 718/1 |
| 2014/0282889 A1 | 9/2014 | Ishaya et al. |

* cited by examiner

SELECTIVELY FILTERING APPLICATIONS FROM AN APPLICATION VOLUME

RELATED APPLICATIONS

This application is related to and claims priority to U.S. patent application Ser. No. 14/482,105, entitled "SELECTIVELY FILTERING APPLICATIONS FROM AN APPLICATION VOLUME," filed Sep. 10, 2014, which itself claims priority to U.S. Provisional Patent Application No. 61/875,991, entitled "SELECTIVELY FILTERING APPLICATIONS FROM AN APPLICATION VOLUME," filed on Sep. 10, 2013, and which are hereby incorporated by reference in their entirety.

TECHNICAL BACKGROUND

Computing systems typically require the installation of one or more applications to accomplish specific tasks. These installations can be both time consuming and waste valuable computing resources. To avoid this problem, applications can be installed ahead of time on attachable storage volumes so as to avoid installation on each computing system. Thus, if a computing system requires an application, the volume containing the application can be attached or mounted, and registry keys and other files within the computing system can be modified to make the application executable.

Although using application storage volumes makes an application available to the computing system without installation on the computing system, each application may be located on a distinct volume. The result is that for each application required on the computing system, a new volume must be attached, which can be both complicated and burdensome on the system as the number of applications increase.

OVERVIEW

Examples disclosed herein provide systems, methods, and software for attaching an application to a computing system. In one example, a method of attaching at least one application to the computing system includes identifying an application attach triggering event, and identifying at least one application based on the application attach triggering event. The method further includes attaching an application volume to the computing system that contains the at least one application, and filtering one or more applications from the application volume that are not the at least one application.

In a further instance, a computer apparatus to attach at least one application to an attachable computing system includes processing instructions that direct a computing system to identify an application attach triggering event for the attachable computing system, and identify the at least one application based on the application attach triggering event. The processing instructions further direct the computing system to attach an application volume to the attachable computing system that contains the at least one application, and filter one or more applications from the application volume that are not the at least one application. The computer apparatus further includes one or more non-transitory computer readable media that store the processing instructions.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
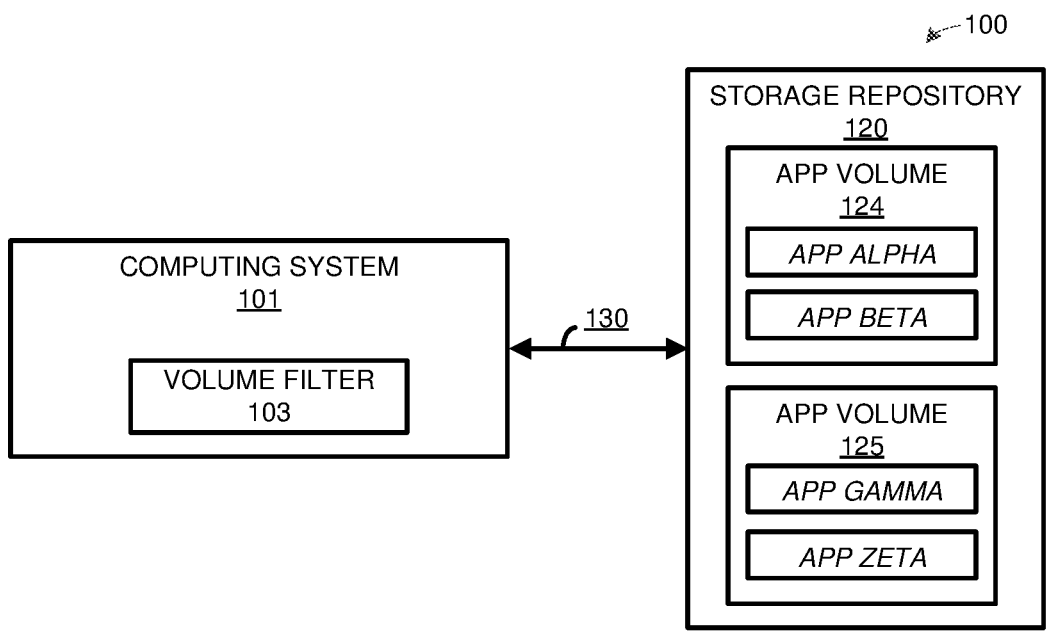
FIG. 1 illustrates a computing environment to attach one or more applications.

Computing systems typically require the installation of one or more applications to accomplish specific tasks. These installations can be both time consuming and waste valuable computing resources. To avoid this problem, applications can be installed ahead of time on attachable storage volumes so as to avoid installation on each computing system. Thus, if a computing system requires an application, the volume containing the application can be attached or mounted, and registry keys and other files within the computing system can be modified to make the application executable. This process may apply similarly to both physical computing systems, such as desktop computers and servers, as well virtual computing systems and virtual machines.

A virtual machine is a virtualized copy of a computer system, with virtual hardware that includes a disk controller, a network card, and other virtual hardware. Frequently, running within the virtual machine is a full operating system, such as Linux or Microsoft Windows. These virtual machines run on a physical host server with a hypervisor that abstracts the physical hardware of the host server so that the virtual machine sees virtual hardware regardless of what the underlying hardware actually comprises.

Storage for the virtual machine can come from a variety of sources including physical devices directly mapped to the virtual machine, SAN connected by iSCSI or Fibre Channel, or files containing virtual disks. In some instances, the storage attached to the virtual machines may include applications that are capable of execution on the virtual machine. To make these applications available, an agent, usually on the virtual machine, notifies the hypervisor to attach the appropriate volume for the application. The volume is then attached by the hypervisor, and registry keys and other files are updated within the virtual machine to make the application appear as though it is local to the machine.

Here, to limit the number of application volumes that are attached to a computing system, an application filter may be applied to attached application volumes. For example, a user of a physical or virtual computing system may require a particular application for execution on the computing system. Responsive to a request for the application, an application volume is identified that contains the application, and the application volume is attached or mounted to the computing system. In addition to the application requested by the end user, the application volume may contain one or more additional applications that are separated into folders or directories. Accordingly, an application filter may be used to prevent the undesired applications from becoming available to the user, while the desired application is made available for execution.

In some examples, one or more virtual machines may be instantiated on a host computing system as a part of a service. This service may allocate the virtual machines to one or more users, allowing the users to select particular applications that suit the users' preferences and requirements. To access the one or more virtual machines, remote computing devices, such as desktop computers, laptop computers, smart phones, tablets, and the like, may remotely login or access the virtual machines using the internet or other similar communication network. Once a virtual machine is accessed by a remote computing device, a user at the remote computing device may select an application to attach to the virtual machine. In response to the application selection, an application storage volume containing the application may be attached or mounted to the virtual machine. Once attached, one or more applications in the application storage volume that were not selected by the user may be filtered or hidden from the user, while the requested application may be made available by modifying registry keys and other settings on the virtual machine. Further, once the user logs off the virtual machine, the application volume may be detached from the virtual machine, preventing future execution of the application while the user is not remotely accessing the machine.

FIG. 1 illustrates a computing environment 100 to attach one or more applications. Computing environment 100 includes computing system 101 and storage repository 120. Storage repository 120 further includes application volumes 124-125. Computing system 101 communicates with storage repository 120 over communication link 130. Computing system 101 may represent a physical computing system, such as a desktop computer or server computer, or a virtual computing system or virtual machine that executes on a host system.

In operation, a user, an administrator of the computing system, or some other process on computing system 101 may require an application. Once the request is recognized as an application attach triggering event, computing system 101 will identify an appropriate storage volume in application volumes 124-125 that contains the application. This application volume will then be attached to computing system 101 using communication link 130, and registry keys and other files within computing system 101 will be modified to make the requested application executable. In some examples, the requested application files, directories, and other elements may be overlaid into a file system for computing system 101. Accordingly, rather than identifying the applications as residing in an attachable volume, the application elements may appear within a Program Files or other similar folder for computing system 101.

Following the attachment to computing system 101, volume filter 103 may be used to eliminate the unrequested applications and files from the application volume. The result is that only the requested application is executable on computing system 101, while the other files are made unavailable to the user and the system. In some examples, the applications may be organized in folders on application volumes 124-125. Thus, the applications that are not requested may have their representative folder filtered by volume filter 103.

Figure 2:
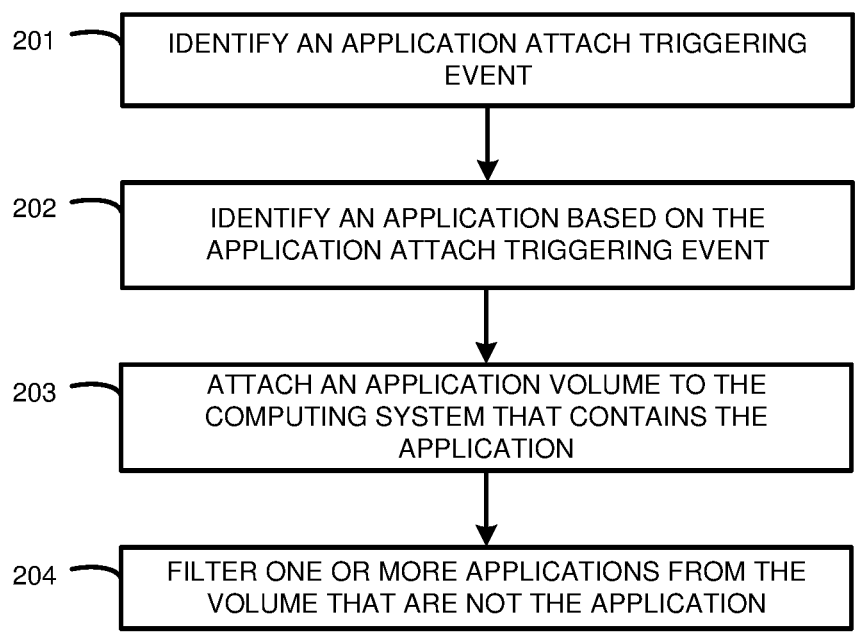
FIG. 2 illustrates a method of attaching an application to computing system.

To further illustrate the operation of computing environment 100, FIG. 2 illustrates a method of attaching an application to a computing system according to one example. The method includes identifying an application attach triggering event (201). An application attach triggering event may include a user selection of an application to attach, a process on computing system 101 requiring the attachment of an application, or any other request for an application on the computing system. In response to the application attach triggering event, the method includes identifying an application based on the application attach triggering event (202). Once the application has been identified, an application volume is attached to the virtual machine that contains the application (203). For example, if a user requested application "Beta" then application volume 124 would be attached to the virtual machine. However, application volume 124 contains both application "Alpha" and application "Beta." To prevent the inclusion of an unwanted application, the method further provides filtering one or more applications from the application volume that are not the application (204). Thus, using the example from above, if the user of virtual machine 102 requested application "Beta", then application "Alpha" could be filtered and made inaccessible. In some occurrences, this filtering may be accomplished by volume filter 106 that is executed on computing system 101.

Returning to FIG. 1, computing system 101 may represent a physical machine, which may include communication interfaces, network interfaces, processing systems, computer systems, microprocessors, storage systems, storage media, or some other processing devices or software systems, and can be distributed among multiple devices. Computing system 101 may include software such as an operating system, logs, databases, utilities, drivers, caching software, networking software, and other software stored on a computer-readable medium. Alternatively, computing system 101 may represent a virtual machine that is capable of execution on a physical or host machine. A virtual machine may abstract the hardware of the physical machine, and execute via a hypervisor on the physical machine.

Storage repository 120 includes application volumes 124-125 that store one or more applications. Storage repository 120 may include volatile and nonvolatile, removable and non-removable media implemented in any method or technology for storage of information, such as computer readable instructions, data structures, program modules, or other data. Storage repository 120 can be implemented as a single storage device but may also be implemented across multiple storage devices or sub-systems.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some examples, storage repository 120 may be made of physical devices such as hard disks or other similar media, SAN connected by iSCSI or Fibre Channel, and files containing virtual disks.

Communication link 130 may use metal, glass, optical, air, space, or some other material as the transport media.

Communication link 130 may use various communication protocols, such as Internet Small Computer Interface (iSCSI), Fibre Channel, Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Although illustrated separate from computing system 101, it should be understood that storage repository 120 might reside wholly or partially on computing system 101.

Figure 3:
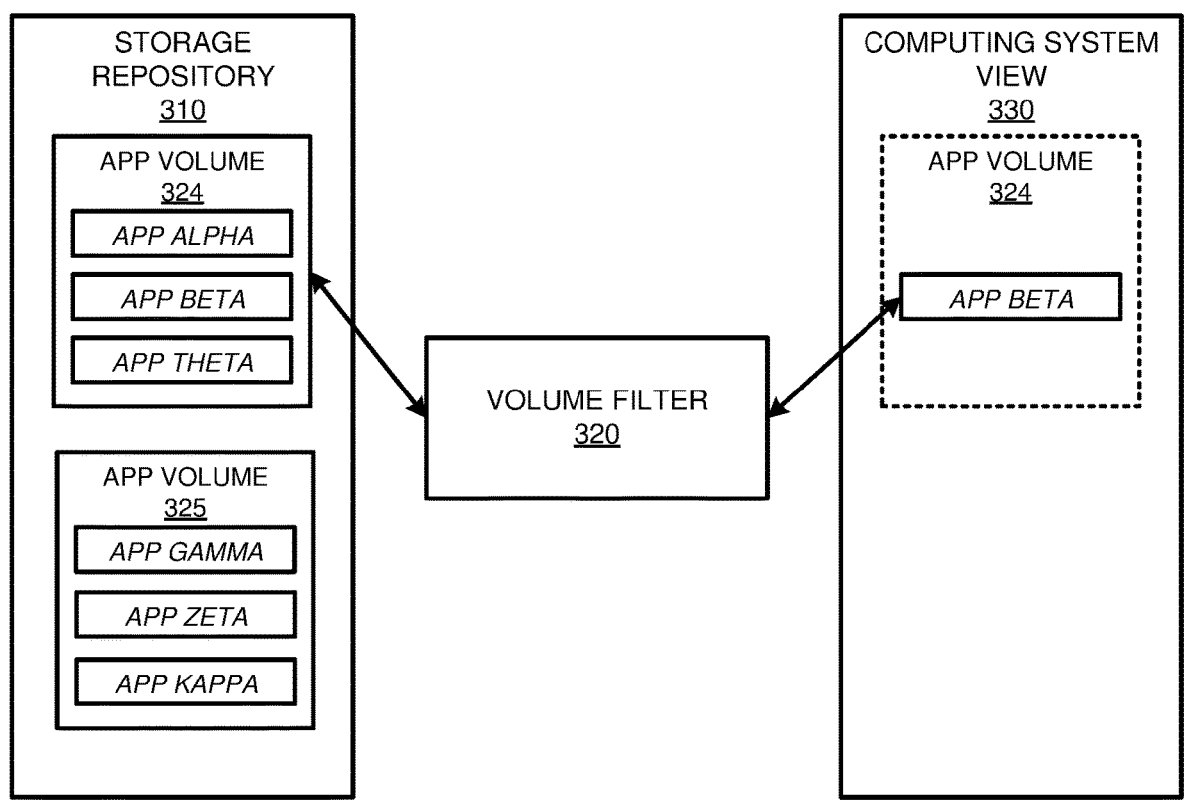
FIG. 3 illustrates an overview for operating a volume filter.

FIG. 3 illustrates an overview for the operation of a volume filter according to one example. FIG. 3 includes storage repository 310, volume filter 320, and computing system view 330. Storage repository 310 further includes application volumes 324-325 that store one more applications.

In operation, a computing system may request that one or more applications become executable on the computing system. This request may come from a user during the operation of the computing system, from an automated process on the computing system, from an administration system external to the computing system, or any other type of request for an application. Upon the detection of the request, or application attach triggering event, a storage volume will be determined that contains the appropriate application. Using the present example, an attach triggering event has requested application "Beta" from storage repository 310. Thus, application volume 324 will be identified to attach to the computing system.

Following the identification of the appropriate storage volume, the volume must be attached to the computing system. This volume may include physical devices that can be directly mapped to the computing system, SAN connected by iSCSI or Fibre Channel, or files containing virtual disks. As illustrated in FIG. 3, these volumes may also contain data that is not necessary for the requested application. For example, application volume 324 contains applications "Alpha," "Beta," and "Theta." Each of these applications may reside on one or more folders that contain the files, directories, and other elements necessary for executing the applications. To prevent the user of the computing system from identifying and executing the unwanted applications when attached, volume filter 320 is provided. Volume filter 320 will identify the volume that is being attached to the computing system, and filter out the folders that contain data items for unwanted applications. Thus, if the user were to select application "Beta" then volume filter 320 may filter out the folders for application "Alpha" and application "Theta." The result would be that only application "Beta" would be visible from computing system view 330.

Figure 4:
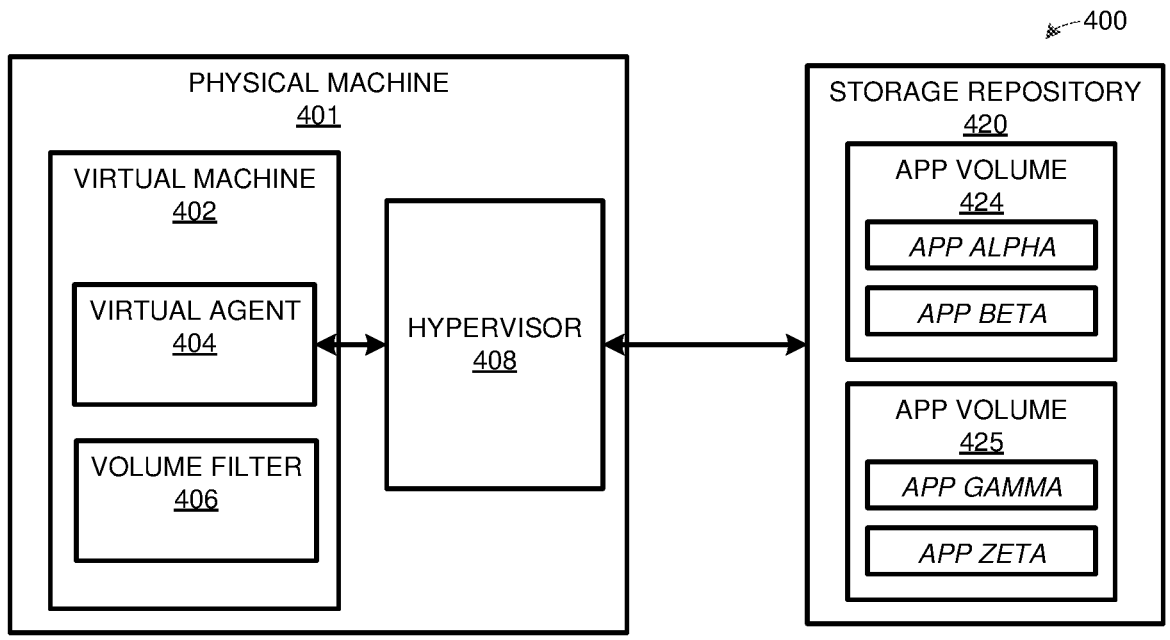
FIG. 4 illustrates a computing environment for attaching an application.

FIG. 4 illustrates a computing environment 400 according to one example. Computing environment 400 includes physical machine 401 that communicates with storage repository 420. Physical machine 401 further includes virtual machine 402, virtual agent 404, volume filter 406, and hypervisor 408. Storage repository 420 further includes application volumes 424-425. Virtual machine 402 is an example of computing system 101, although other examples are possible.

In operation, hypervisor 408 will operate on physical machine 401 to facilitate the execution of virtual machines, such as virtual machine 402. Physical machine 401, sometimes referred to as a host machine, may include one or more hypervisors to execute one or more virtual machines, concurrently. As illustrated in computing system 400, virtual machine 402 includes virtual agent 404 that is used to communicate with hypervisor 408, and in some instances a virtual machine manager. Virtual agent 404 is responsible for identifying attach-triggering events, such as a user selection of an application, and notifying hypervisor 408 to attach the appropriate storage volume containing the application. Once hypervisor 408 attaches the appropriate volume to virtual machine 401, virtual agent 404 or another software module within the virtual machine may modify the registry keys and file system to enable the execution of the application on the virtual machine.

In some examples, the selected storage volume that is attached to the virtual machine may contain more than one application. Thus, if a user only requires a single application within the storage volume, the other applications must be filtered to prevent them from being accessible within the virtual machine. To accomplish this task, volume filter 406 is provided. Volume filter 406 filters the unwanted applications for virtual machine 402 and ensures only the intended application is visible within the attached volume. For example, if a user requested to attach application "Alpha" to the virtual machine, volume filter 406 will take app volume 424 and filter out application "Beta" such that only the files and directories for application "Alpha" are available to virtual machine 402.

In some instances, the applications within the application volumes are organized into folders. As a result, volume filter 406 can filter out the application folders that are not needed, resulting in hidden folders that are not accessible to the user within the file system.

Figure 5:
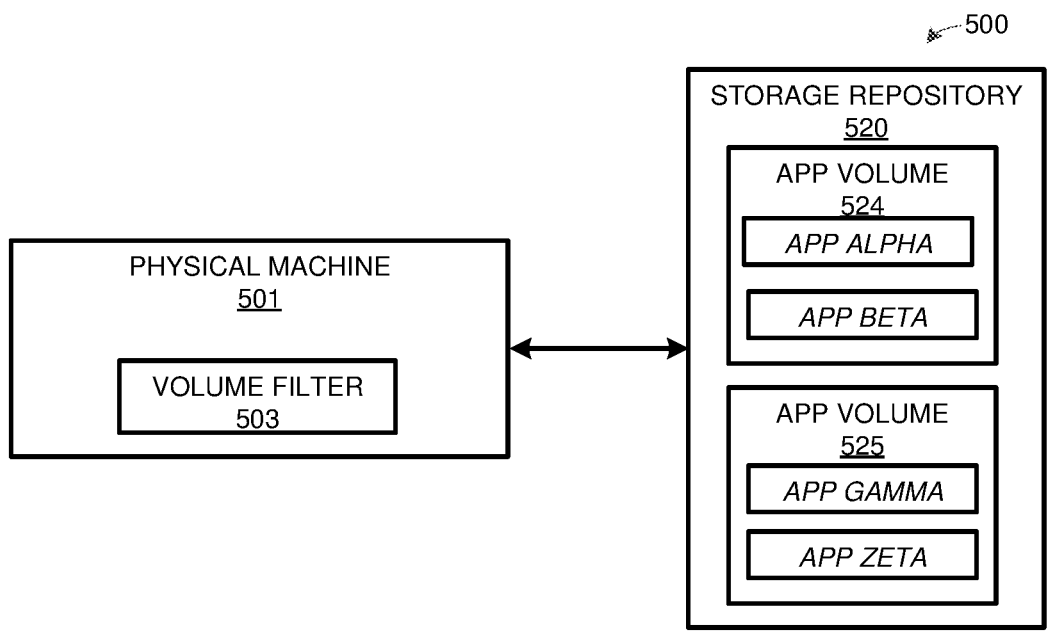
FIG. 5 illustrates a computing environment for attaching an application.

FIG. 5 illustrates a computing environment 500 for attaching an application to a physical machine. Computing environment 500 includes physical machine 501 and storage repository 520. Physical machine 501 is an example computing system 101, and may represent a desktop computer, a server computer, or some other type of physical computing system.

During execution, a user or some other process on physical machine 501 may require an application. Once the request is recognized as an attach triggering event, physical machine 501 will identify an appropriate storage volume out of application volumes 524-525 that contains the application. This application volume with the application will then be attached to physical machine 501, and registry keys and other files within physical machine 501 will be modified to make the application executable.

Following the attachment to physical machine 501, volume filter 503 may then be used to filter or hide the unrequested applications and files on the attached volume. The result is that only the requested application is executable on computing system 101, while the other files are essentially unavailable to the system. For instance, physical machine 501 may require the application "Gamma" within application volume 525. Once application volume 525 is attached, volume filter 503 may be used to filter application "Zeta" and any other data from application volume 525 that is not required by physical machine 501. This filtering may include hiding and preventing access to unnecessary files by the user or other processes on physical machine 501.

Figure 6:
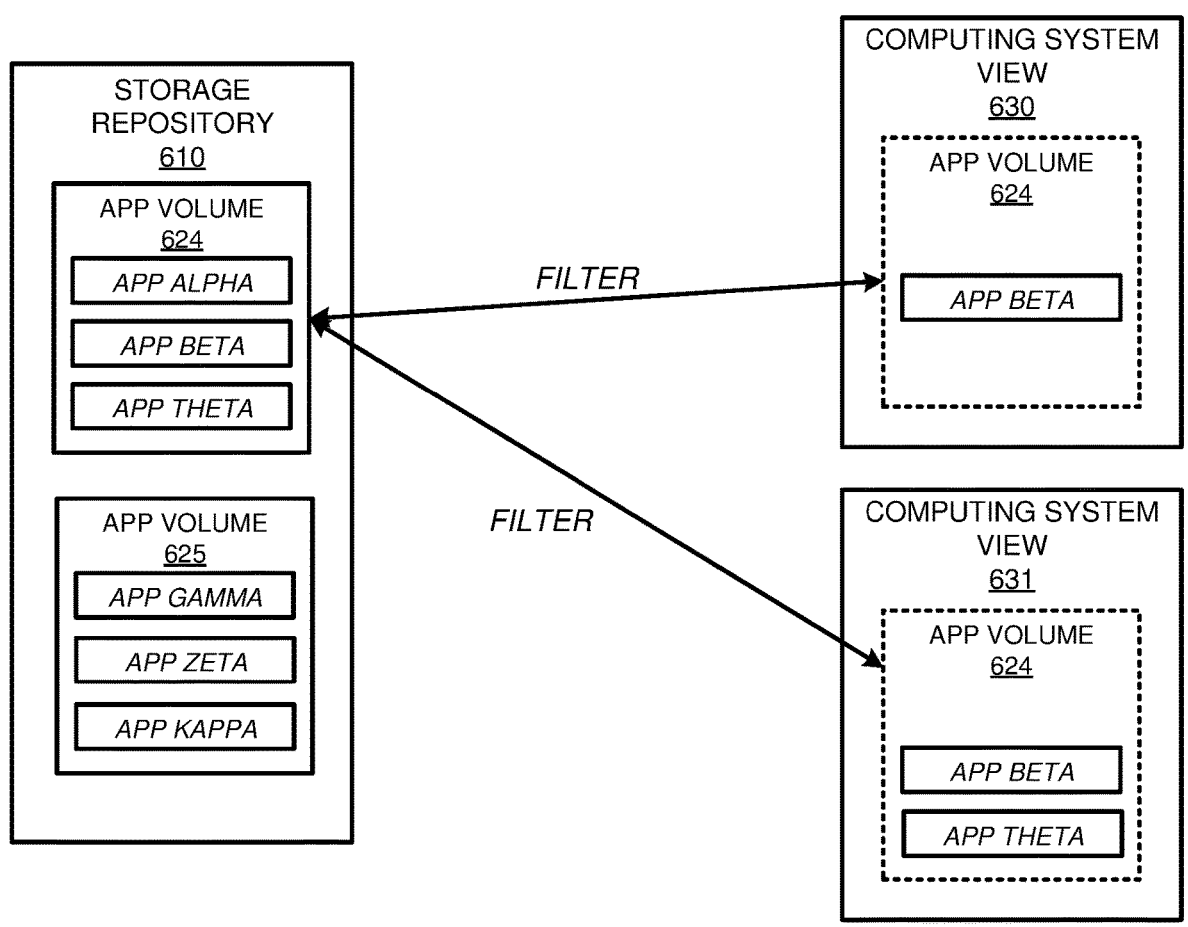
FIG. 6 illustrates an overview of attaching application volumes to multiple computing devices.

FIG. 6 illustrates an overview of attaching application volumes to multiple computing devices. FIG. 6 includes storage repository 610, and computing system views 630-631. Storage repository 610 further includes application volumes 624-625, which each includes a plurality of applications for execution on various computing systems.

In operation, computing systems require various applications to perform desired tasks, such as productivity applications, video and image editing applications, gaming applications, amongst a variety of other applications. To make these applications available, storage repository 610 is provided that includes application volumes 624-625. Within each of the application volumes are applications capable of execution upon attachment to one or more computing devices. Here, computing system view 630 and computing system view 631 are representative of the attached application view within two computing devices. As illustrated, each of the computing systems requires the attachment of application volume 624, although each computing system requires a different application set from application volumes 624.

Accordingly, to generate distinct computing system views 630-631, an application filter may be applied for application volume 624. For example, upon an application attach triggering event corresponding to computing system view 630, application volume 624 will be identified and attached or mounted to the computing system. Once attached, application "Beta" may be made available, but applications "Alpha" and "Theta" may be filtered to prevent execution on the computing system. In some examples, to filter the application, the filter may be used to prevent the unwanted applications from appearing within the file system for the computing system. Thus, the user and processes of the computing system may not recognize that other applications are stored on the same storage volume.

Similar to generating computing system view 630, computing system view 631 may be generated using an application filter to refine attached applications. In contrast to the single application provided for computing system view 630, computing system view 631 requires two applications from application volume 624. Responsive to this requirement, the application filter hides application "Alpha" from computing system view 631. As a result, although computing system views 630-631 each attach the same application volume, an application filter may be used to customize the individual applications that are provided to each computing system.

As illustrated in the present example, application "Beta" is required to generate both computing system view 630 and computing system view 631. Accordingly, the files and directories for application "Beta" may include read only files that can be read by multiple computing systems at a single instance. Further, although illustrated in the present example with two computing systems requesting applications, it should be understood that any number of computing systems might request applications from storage repository 610.

Figure 7:
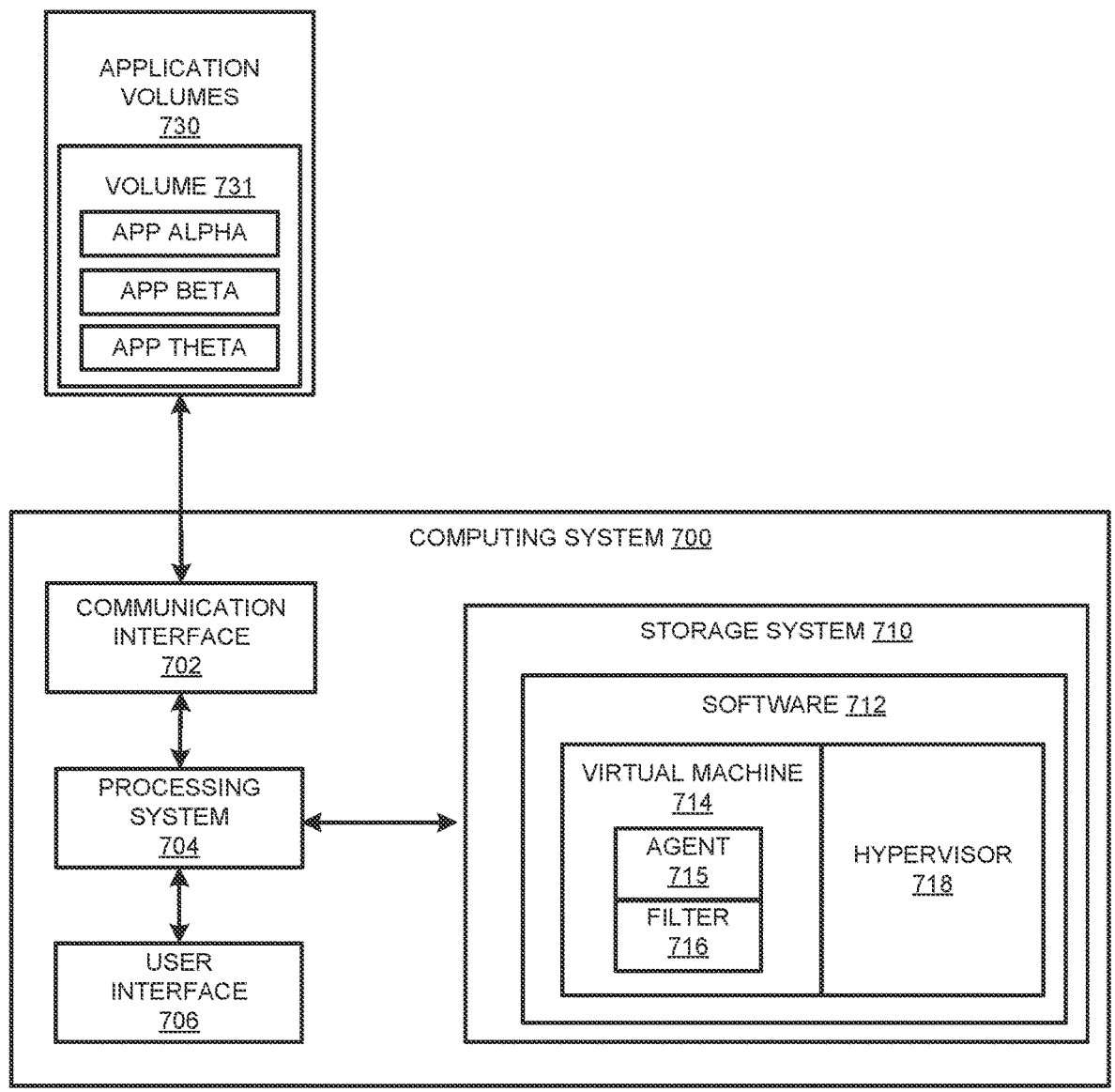
FIG. 7 illustrates a computing system for attaching an application to a computing system.

FIG. 7 illustrates a computing system 700 for attaching an application to a virtual machine. Computing system 700 is an example of computing system 101, although other examples may exist. Computing system 700 includes communication interface 702, processing system 704, user interface 706, storage system 710, and software 712. Processing system 704 loads and executes software 712 from storage system 710. Software 712 includes virtual machine 714, which is capable of operating on computing system 700. Software 712 may further include an operating system, utilities, drivers, network interfaces, applications, or some other type of software. When executed by computing system 700, software 712 directs processing system 704 to attach an application to virtual machine 714 as described herein.

In a particular example, virtual machine 714 will execute on computing system 700. Virtual machine 714 is a virtualized copy of a computing system, such as computing system 700, with virtual hardware, such as a disk controller, a network controller, and other virtual computing hardware. Virtual machine 714 executes on hypervisor 718 that abstracts the physical hardware of the host server, in this case computing system 700, so that the virtual machine sees virtual hardware regardless of what the underlying hardware of computing system 700 actually comprises.

In operation, a user or some other process within virtual machine 714 may require an application. To provide the application, one or more application volumes 730 are available to the virtual machine that contains the required applications. Thus, instead of installing the application using the standard application installer, the application may be attached from application volumes 730 and become available for execution upon attachment.

Once the user or process determines that a new application needs to be added to virtual machine 714 (attach triggering event), the appropriate application volume is determined that contains the application. In some examples, such as with application volume 731, the volume may contain a plurality of applications. As a result, some of the applications may not be required by virtual machine 714. To prevent these unwanted applications from becoming visible within virtual machine 714, application filter 716 is provided to filter out the unwanted applications. For instance, if an attach triggering event request application "Theta" for virtual machine 714, then volume 731 would be attached and applications "Alpha" and "Beta" would be filtered or hidden by application filter 716.

Although illustrated within virtual machine 714, it should be understood that filter 716 might reside anywhere in software 712. By residing as a software module within software 712, application filter 716 could allow application volumes 730 to be attached or mounted to computing system 700. After being attached, filter 716 can filter out the files and directories for other applications to ensure that only the requested application is executable on computing system 700.

Computing system 700 further includes communication interface 702 that may be configured to communicate with application volumes 730. Communication interface 702 may communicate using Internet Small Computer Interface (iSCSI), Fibre Channel, Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format. Although illustrated separate from computing system 700 it should be understood that application volumes 730 may reside wholly or partially within computing system 700.

Referring still to FIG. 7, processing system 704 can comprise a microprocessor and other circuitry that retrieves and executes software 712 from storage system 710. Processing system 704 can be implemented within a single processing device but can also be distributed across multiple processing devices or sub-systems that cooperate in executing program instructions. Examples of processing system 704 include general-purpose central processing units, application specific processors, and logic devices, as well as any other type of processing device, combinations of processing devices, or variations thereof.

Storage system 710 can comprise any storage media readable by processing system 704, and capable of storing software 712. Storage system 710 can include volatile and nonvolatile, removable and non-removable media implemented in any method or technology for storage of information, such as computer readable instructions, data structures, program modules, or other data. Storage system 710 can be implemented as a single storage device but may also be implemented across multiple storage devices or subsystems. Storage system 710 can comprise additional elements, such as a controller, capable of communicating with processing system 704.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

User interface 706 can include a mouse, a keyboard, a camera, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in user interface 706. In some examples, user interface 706 may be omitted.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   identifying an application attach triggering event for a computing system;
   identifying an application volume with at least one application associated with the application attach triggering event, wherein the application volume comprises files to support the execution of the at least one application and additional files to support the execution of one or more other applications;
   attaching the application volume to the computing system;
   applying a filter to the application volume for the computing system, wherein applying the filter to the application volume comprises:
      permitting the at least one application to be visible and executable on the computing system from the application volume; and
      preventing the one or more other applications from being visible or executable on the computing system from the application volume;
   attaching the application volume to a second computing system;
   applying a second filter to the application volume for the second computing system, wherein applying the second filter to the application volume comprises:
      permitting one or more applications to be visible and executable on the second computing system from the application volume, wherein the one or more applications are not equivalent to the at least one application; and
      preventing one or more remaining applications other than the one or more applications from being visible and executable on the second computing system from the application volume.

2. The method of claim 1, wherein the computing system comprises a virtual machine.

3. The method of claim 1, wherein the computing system comprises a physical computing system.

4. The method of claim 1, wherein permitting the at least one application to be visible and executable in the computing system comprises overlaying the files in a file system of the computing system.

5. The method of claim 1, wherein attaching the application volume to the computing system comprises mounting the application volume to the computing system.

6. The method of claim 1, wherein identifying the application attach triggering event comprises receiving a selection of the at least one application on the computing system.

7. The method of claim 1, wherein the computing system comprises a virtual machine, and wherein identifying the application attach triggering event comprises receiving a request from an administrator associated with the virtual machine to attach the at least one application to the virtual machine.

8. The method of claim 1, wherein the application volume is attached to a second computing system.

9. A computing apparatus comprising:
   a storage system;
   a processing system operatively coupled to the storage system; and
   program instructions stored on the storage system that, when executed by the processing system, direct the computing apparatus to:
      identify an application attach triggering event for a computing system;
      identify an application volume with at least one application associated with the application attach triggering event, wherein the application volume comprises files to support the execution of the at least one application and additional files to support the execution of one or more other applications;
      attach the application volume to the computing system;
      apply a filter to the application volume for the computing system, wherein applying the filter to the application volume comprises:
         permitting the at least one application to be visible and executable on the computing system from the application volume; and
         preventing the one or more other applications from being visible or executable on the computing system from the application volume;
      attach the application volume to a second computing system;
      apply a second filter to the application volume for the second computing system, wherein applying the second filter to the application volume comprises:
         permitting one or more applications to be visible and executable on the second computing system from the application volume, wherein the one or more applications are not equivalent to the at least one application; and preventing one or more remaining applications other than the one or more applications from being visible and executable on the second computing system from the application volume.

10. The computing apparatus of claim 9, wherein the computing system comprises a physical computing system.

11. The computing apparatus of claim 9, wherein the computing system comprises a physical computing system.

12. The computing apparatus of claim 9, wherein permitting the at least one application to be visible and executable in the computing system comprises overlaying the files in a file system of the computing system.

13. The computing apparatus of claim 9, wherein attaching the application volume to the computing system comprises mounting the application volume to the computing system.

14. The computing apparatus of claim 9, wherein identifying the application attach triggering event comprises receiving a selection of the at least one application on the computing system.

15. The computing apparatus of claim 9, wherein the computing system comprises a virtual machine, and wherein identifying the application attach triggering event comprises receiving a request from an administrator associated with the virtual machine to attach the at least one application to the virtual machine.

16. The computing apparatus of claim 9, wherein the application volume is attached to a second computing system.

17. An apparatus comprising:
a storage system;
program instructions on the storage system that, when executed by a processing system, direct the processing system to:
identify an application attach triggering event for a virtual machine, wherein the application attach triggering event comprises a request from a user of the virtual machine to attach at least one application;
identify an application volume with the at least one application associated with the application attach triggering event, wherein the application volume comprises files to support the execution of the at least one application and additional files to support the execution of one or more other applications;
attach the application volume to the virtual machine;
apply a filter to the application volume for the virtual machine, wherein applying the filter to the application volume comprises:
permit the at least one application to be visible and executable on the virtual machine from the application volume; and
prevent the one or more other applications from being visible or executable on the virtual machine from the application volume;
attach the application volume to a second computing system;
apply a second filter to the application volume for the second computing system, wherein applying the second filter to the application volume comprises:
permitting one or more applications to be visible and executable on the second computing system from the application volume, wherein the one or more applications are not equivalent to the at least one application; and
preventing one or more remaining applications other than the one or more applications from being visible and executable on the second computing system from the application volume.

18. The apparatus of claim 17, wherein the application volume is attached to one or more other virtual machines.

* * * * *